(12) United States Patent
Augnet

(10) Patent No.: US 7,617,915 B2
(45) Date of Patent: Nov. 17, 2009

(54) METHOD AND PRODUCT FOR MANUFACTURING BRAKE PADS

(75) Inventor: Francois Augnet, Remagen-Oberwinter (DE)

(73) Assignee: TRW KFZ - Ausrustung GmbH (DE)

( * ) Notice: Subject to any disclaimer, the term of this patent is extended or adjusted under 35 U.S.C. 154(b) by 316 days.

(21) Appl. No.: 11/628,545

(22) PCT Filed: Jun. 1, 2005

(86) PCT No.: PCT/EP2005/005910

§ 371 (c)(1),
(2), (4) Date: Dec. 4, 2006

(87) PCT Pub. No.: WO2005/119081

PCT Pub. Date: Dec. 15, 2005

(65) Prior Publication Data

US 2008/0070048 A1    Mar. 20, 2008

(30) Foreign Application Priority Data

Jun. 3, 2004    (EP) .................................. 04013123

(51) Int. Cl.
*F16D 69/00*    (2006.01)

(52) U.S. Cl. .............................. 188/250 B; 188/250 D; 188/251 A

(58) Field of Classification Search ................. 428/457; 29/412; 188/250 R, 251 A, 250 H, 250 D, 188/250 G, 250 B See application file for complete search history.

(56) References Cited

U.S. PATENT DOCUMENTS 4,042,658 A * 8/1977 Collins ....................... 264/45.5
6,479,413 B1   11/2002 Booher

FOREIGN PATENT DOCUMENTS

| DE | 31 46 791 A1 | 8/1982 |
| JP | 2000 027914 A | 1/2000 |

* cited by examiner

*Primary Examiner*—Melanie Torres
(74) *Attorney, Agent, or Firm*—MacMillan, Sobanski & Todd, LLC

(57) ABSTRACT

A brake pad is, in order to reduce stock keeping and for flexible adjustment to varying demands regarding the dimensions, manufactured by providing a plate the dimensions of which are essentially larger than the dimensions of the smallest brake pad to be manufactured. From that plate a brake pad is cut comprising at least partially its final dimensions.

4 Claims, 2 Drawing Sheets

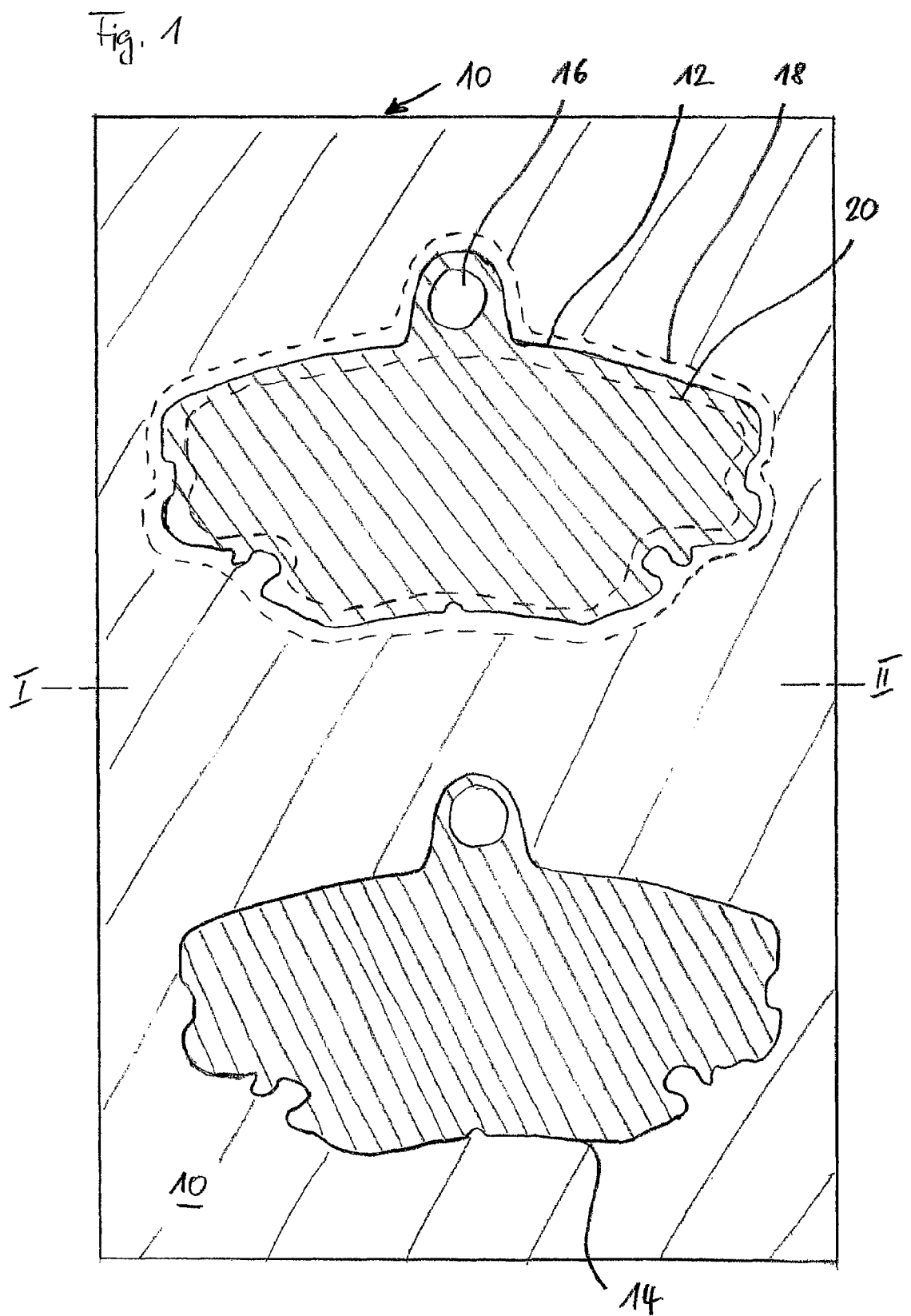

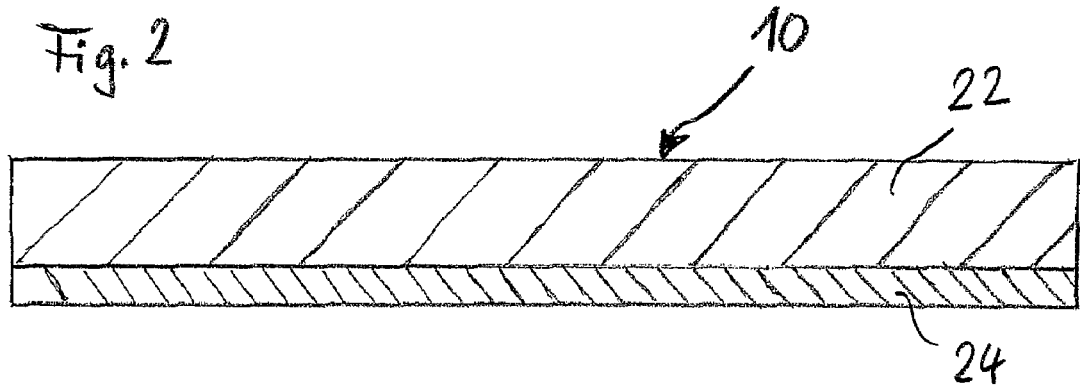
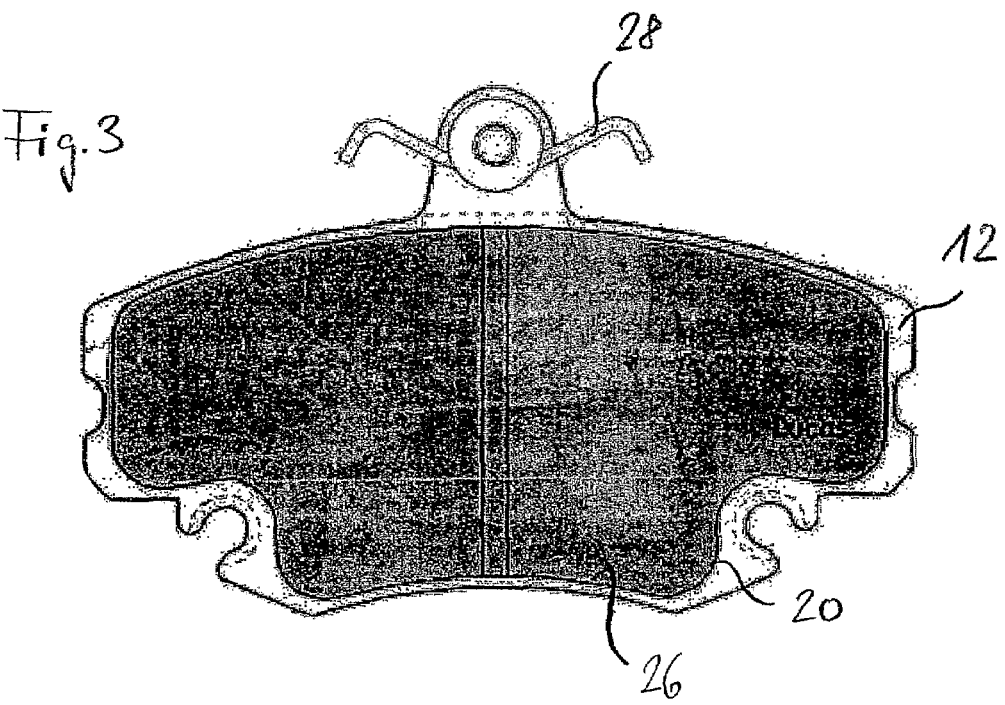

METHOD AND PRODUCT FOR MANUFACTURING BRAKE PADS

CROSS-REFERENCE TO RELATED APPLICATIONS

This application is a national stage of International Application No. PCT/EP2005/005910 filed Jun. 1, 2005, the disclosures of which are incorporated herein by reference in entirety, and which claimed priority to European Patent Application No. 04 013 123.7 filed Jun. 3, 2004, the disclosures of which are incorporated herein in entirety.

BACKGROUND OF THE INVENTION

The invention is concerned with manufacturing brake pads, in particular for disc brakes.

According to the art, brake pads for disc brakes usually are composed of a carrier plate, e.g. made from steel, and a brake lining which is pressed against the disc in order to generate braking action.

According to the prior art such brake pads are manufactured by producing first a carrier plate comprising its final dimensions (i.e. the dimensions in the final brake pad) and, thereafter, the lining is attached to the carrier plate, wherein the lining also has already its final dimensions. The attachment is e.g. obtained by a glue.

According to this known method of manufacture, each brake pad is completely finished at the manufacturer's premises and then shipped to the distributors and final users. This causes a complex and laborious stock keeping of several sizes of brake pads.

BRIEF SUMMARY OF THE INVENTION

The technical problem underlying the present invention is to provide a method and a product for manufacturing brake pads reducing the stockkeeping requirements and allowing a less laborious adjustment as to varying size requirements at the market place. Also, the transportation from the manufacturer to the distributor and other users shall be reduced.

To this end, the invention teaches a method for manufacturing brake pads comprising the following steps:
 providing a plate comprising a lining, said plate having dimensions substantially larger than the dimensions of the smallest brake pad to be manufactured, and
 cutting the brake pad to be manufactured from said plate, at least partially in accordance with the final dimensions of the brake pad.

According to the invention, therefore, a manufacturer can produce said plates and deliver them to customers, wherein the customer can produce from said plates with relatively simple equipment brake pads for vehicle brakes. This manufacturing process comprises good flexibility regarding varying local demands. The present invention is most suitable in connection with so-called "Fast-Fit-Workshops". Such workshops can manufacture with relatively inexpensive equipment and with practically neglectable stockkeeping different brake pads, depending on the local actual demand.

The prior art brake pads, in particular for disc brakes, comprise regularly a carrier plate, typically made from steel and a friction lining made from a different material since the mechanical requirements regarding the carrier plate, which shall transfer the strong braking forces into the brake carrier, on the one hand, and the requirements regarding the lining, on the other hand, are substantially different. If the method according to the present invention is applied to such brake pads, said step of cutting the plate comprises, according to one embodiment, that the material of the carrier plate, e.g. steel, is cut to its final dimensions, i.e. the dimensions in the completed brake pad. During that cut the layer of lining material of the plate also obtains the contour (outline) on the carrier plate. Thereafter, the material of the lining on the carrier plate is formed into its final shape. During that formation normally an area is obtained at the edge of the carrier plate not covered by lining material.

According to another embodiment of the method of the present invention for manufacturing brake pads, initially part of the friction lining layer is removed from the plate, e.g. by milling, approximately following the outline (contour) of the brake pad to be manufactured such that a part of the carrier plate layer of the plate is free from lining material, corresponding the contour of the carrier plate to be manufactured, such that thereafter the carrier plate layer can be cut in accordance with that contour, for example by means of a laser beam or a water jet.

The invention is also concerned with a plate for manufacturing brake pads, said plate being an "intermediate product", i.e. a plate that has dimensions essentially larger than the dimensions of the brake pad to be manufactured, said plate comprising friction lining material as a layer. If a conventional brake pad is manufactured comprising a carrier plate made of steel or the like and a friction lining made of a material having a large friction coefficient, said plate comprises the above-mentioned two layers, namely a carrier plate layer and a lining layer. Furthermore, the plate has e.g. dimensions sufficient to manufacture two or more brake pads from that plate.

Other advantages of this invention will become apparent to those skilled in the art from the following detailed description of the preferred embodiments, when read in light of the accompanying drawings.

BRIEF DESCRIPTION OF THE DRAWINGS

FIG. 1 shows a plate for manufacturing two brake pads;
FIG. 2 shows a cross section of the plate according to FIG. 1 along the line I-II; and
FIG. 3 shows a complete brake pad.

DETAILED DESCRIPTION OF THE INVENTION

According to FIG. 1, a plate 10 is large enough so that two brake pads can be manufactured from that plate. According to FIG. 3 the brake pad to be manufactured comprises in a conventional manner a carrier plate 12 and a friction lining 26. The friction lining has a contour (outline, presented in FIG. 3 as a darkened area) smaller than contour of the carrier plate.

FIG. 2 shows the plate of FIG. 1 in cross section along the line I-II. As is shown in FIG. 2, the plate 10 of FIG. 1 is composed of two layers, namely a layer of friction material 22 and a layer of carrier plate material 24. Initially, both said layers of friction material 22 and carrier plate material 24 are continuous along the entire plate 10 according to FIG. 1.

FIG. 1 shows in continuous lines the contours (outlines) of two carrier plates 12, 14 as these carrier plates are formed in the final complete product. As is known as such in the art, the carrier plates 12, 14 comprise a protrusion with a hole 16 for receiving a mounting spring 28 (cf. FIG. 3). Dashed lines in FIG. 1 show an outer contour 18 and an inner contour 20 which run outside and, respectively, inside the contour of the carrier plate 12 to be manufactured. In FIG. 1 these dashed lines are shown only in connection with carrier plate 12, however, with regard to the other carrier plate 14 corresponding dashed lines can be drawn (not shown).

According to a first method of manufacturing brake pads from plate 10 in its initial state, as described above, an appropriate cutting means, e.g. a focussed laser beam, a water beam or a milling machine can be used to cut the plate 10 along the continuous line.

As a result, that method yields a blank for a brake pad comprising a carrier plate 12 already essentially in its final contour, apart from polishing the edge or deburring (if any), whereas the layer of friction material has not yet its final shape which is indicated by line 20 (see FIGS. 1 and 3). Accordingly, the blank is further processed such that along the edge of that plate the friction material is removed. As a result, a brake pad in accordance with FIG. 3 is obtained.

According to another embodiment of the method of manufacturing a brake pad, the plate 10 in its initial state is processed such that lining friction material 22 in between the dashed lines of the outer contour 18 and the inner contour 20, respectively, is removed, e.g. by millcut. Thereafter, the area between the dashed lines of FIG. 1 is free from friction material and the carrier plate material 24 (FIG. 2) is exposed, wherein the lining to be manufactured has already obtained its final form. Thereafter, only the carrier plate material 24 must be cut, e.g. using a water beam or a laser beam, along the continuous line of FIG. 1, corresponding to the final shape of the carrier plate, in order to obtain a brake pad as shown in FIG. 3, in which the mounting spring 28 is inserted into the hole 16.

Although described above with respect to a steel carrier plate it should be appreciated that other materials can be used for the carrier plate, e.g. Aluminium, Plastics, Metal Composites either on their own or as part of sandwich design.

Depending on the material chosen for the carrier plate the exposed surfaces thereof may be subjected to an anti-corrosion treatment e.g. painting. The dimensions of the plate 10 are such that two or more brake pads can be cut from a single plate. This applies to all brake pads to be manufactured from such plates, in particular to the brake pads having the largest dimensions.

In accordance with the provisions of the patent statutes, the principal and mode of operation of this invention have been explained and illustrated in its preferred embodiments. However, it must be understood that this invention may be practiced otherwise than as specifically explained and illustrated without departing from its spirit or scope.

The invention claimed is:

1. A method of manufacturing brake pads, the method comprising the steps of:
   (a) providing a plate having dimensions such that at least two brake pads can be manufactured from the plate and which comprises a first layer of lining friction material and a second layer of material for a carrier plate of the at least two brake pads, wherein the first layer covers essentially fully the second layer;
   (b) removing from the plate part of the first layer of the friction lining material following a circumferential outline of each of the at least two brake pads to be manufactured such that a part of the second layer of material for the carrier plate of the plate corresponding to a contour of the carrier plate to be manufactured is free from the friction lining material; and
   (c) cutting the plate in accordance with the contour of the carrier plate to be manufactured.

2. The method according to claim 1, wherein during the step of cutting the second layer is cut to the final dimensions of the carrier plate of the at least two brake pads to be manufactured.

3. The method according to claim 1, wherein the at least two brake pads to be manufactured from the plate are spaced in the plate.

4. The method according to claim 1, wherein in step (b) the first layer of the lining friction material is removed from the plate between lines which are on both sides of an outer contour of the carrier plate to be manufactured.

* * * * *